United States Patent [19]
Yokoi et al.

[11] Patent Number: 4,469,337
[45] Date of Patent: Sep. 4, 1984

[54] SEALING BOOT OF ELASTOMERIC MATERIAL

[75] Inventors: Masatada Yokoi, Toyota; Toshio Kondo, Okazaki; Masayoshi Katagiri, Toyota; Tetsuo Kaisaku, Kounan; Yoji Mizuno, Aichi, all of Japan

[73] Assignees: Aisin Seiki Kabushiki Kaisha, Kariya; Toyota Jidosha Kabushiki Kaisha, Toyota; Toyoda Gosei Kabushiki Kaisha, Aichi, all of Japan

[21] Appl. No.: 475,232

[22] Filed: Mar. 14, 1983

[30] Foreign Application Priority Data

Mar. 19, 1982 [JP] Japan ............................ 57-39941[U]

[51] Int. Cl.$^3$ ................................................ F16J 15/32
[52] U.S. Cl. ................................ 277/212 FB; 403/36
[58] Field of Search .................. 277/212 FB; 403/36, 403/134; 74/18.1, 18.2

[56] References Cited

FOREIGN PATENT DOCUMENTS 910969 11/1962 United Kingdom .
935746 9/1963 United Kingdom .
1324326 7/1973 United Kingdom .
1548878 7/1979 United Kingdom .
1584287 2/1981 United Kingdom .

*Primary Examiner*—Robert I. Smith
*Attorney, Agent, or Firm*—Oblon, Fisher, Spivak, McClelland & Maier

[57] ABSTRACT

A sealing boot of elastomeric material for hermetically enclosing an annular opening between a support member and a movable member axially reciprocable on the support member, the sealing boot including a tubular bellows which is integrally formed at one end thereof with a first cylindrical sealing sleeve portion coupled over the support member and at the other end thereof with a second cylindrical sealing sleeve portion coupled within the movable member, the sealing boot being characterized in that the first cylindrical sealing sleeve portion being connected substantially at its center to the one end of the tubular bellows and being formed at its inner end shoulder with an annular thick wall tapering radially toward the inner wall surface of the tubular bellows.

2 Claims, 4 Drawing Figures

SEALING BOOT OF ELASTOMERIC MATERIAL

BACKGROUND OF THE INVENTION

The present invention relates to sealing boots, and more particularly to a sealing boot of elastomeric material for use to arrange a seal at a sliding portion in an hydraulically operated disc brake assembly, a sliding portion in a piston and wheel cylinder assembly or the like in order to prevent entry of foreign matter such as water, dirt and mud into an annular opening at the sliding portion.

Such a sealing boot as described above is an integral one-piece moulding of synthetic rubber or rubber like material which is arranged to hermetically enclose an annular opening between support and movable members in relatively reciprocable relationship. The sealing boot includes a tubular bellows which is integrally formed at the opposite ends thereof with a pair of cylindrical sealing sleeve portions respectively attached to the support and movable members. In such a construction, one of the cylindrical sealing sleeve portions is integrally connected substantially at its center to one end of the tubular bellows to effect a reliable sealing ability during expansion and contraction of the bellows in relative movements of the support and movable members. For example, in a conventional sealing boot as shown in FIG. 4, a cylindrical sealing sleeve portion 2 of generally rectangular cross-section is integrally connected substantially at its center with one end 1*a* of a tubular bellows portion 1. During the moulding process of such a sealing boot, the sealing sleeve portion 2 on a moulding die 3 is arranged to be removed by the air under pressure from an arrow direction A. It has, however, been experienced that the sealing sleeve portion 2 may not be removed from the moulding die 3 because the air entering between the inner peripheral surface 2*a* of portion 2 and the corresponding surface of die 3 pushes up the sealing sleeve portion 2 to cause abutment at its inner end shoulder against the corresponding annular protrusion of die 3. This results in time consumption for removal of the sealing sleeve portion 2 from the die 3.

SUMMARY OF THE INVENTION

The present invention is directed to provide an improved sealing boot which will avoid the foregoing disadvantages to enhance the productivity thereof.

According to the present invention, there is provided a sealing boot of elastomeric material for hermetically enclosing an annular opening between support and movable members in relatively reciprocable relationship, the sealing boot including a tubular bellows which is integrally formed at the opposite ends thereof with a pair of cylindrical sealing sleeve portions respectively attached to the support and movable members, wherein one of the sealing sleeve portions is connected substantially at its center to one end of the tubular bellows and is formed at its inner end shoulder with an annular thick wall tapering radially toward the inner wall surface of the tubular bellows.

BRIEF DESCRIPTION OF THE DRAWING

Additional feature and advantages of the present invention will be more readily apparent from the following detailed description of a preferred embodiment thereof when taken together with the accompanying drawing, in which.

DETAILED DESCRIPTION OF THE PREFERRED EMBODIMENT

Figure 1:
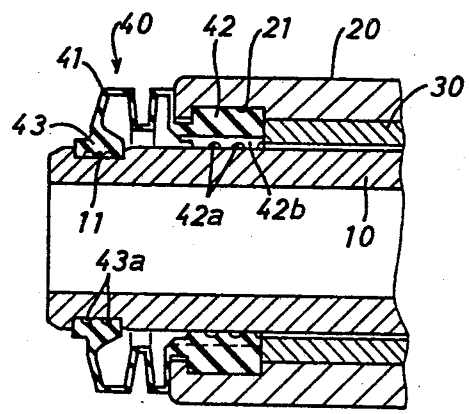
FIG. 1 is a part sectional view of parts of an hydraulically operated disc brake assembly, including a pin-bush and a pin-support portion provided with a sealing boot in accordance with the present invention.

Referring now to the drawing, FIG. 1 illustrates a sliding portion in an hydraulically operated disc brake assembly of the pin-slide type for vehicles, where a movable member in the form of a pin-support portion 20 of a movable calliper (now shown) is coupled over a support member in the form of a pin-bush 10 to be axially reciprocable on pin-bush 10 through a metal bearing 30 secured therein. In such an arrangement at the sliding portion, a sealing boot 40 in the form of an integral one-piece moulding of elastomeric material such as synthetic rubber is assembled between pin-bush 10 and pin-support portion 20. The sealing boot 40 includes a tubular bellows 41 which is integrally formed at the outer end thereof with a cylindrical sealing sleeve portion 43 of small diameter and at the inner end thereof with a cylindrical sealing sleeve portion 42 of large diameter. The sealing sleeve portion 42 is coupled within an annular groove 21 of pin-support portion 20 with a press fit, while the sealing sleeve portion 43 is coupled within an annular groove 11 of pin-bush 10 with a press fit in such a manner that the tubular bellows 41 is arranged to prevent entry of foreign matter such as water, dirt and mud into an annular opening between pin-bush 10 and pin-support portion 20. The inside sealing sleeve portion 42 is formed at its inner periphery with two parallel annular grooves 42*a*, 42*a* and axial slots 42*b*. The outside sealing sleeve portion 43 is formed at its inner periphery with two parallel annular grooves 43*a*, 43*a*.

Figure 2:
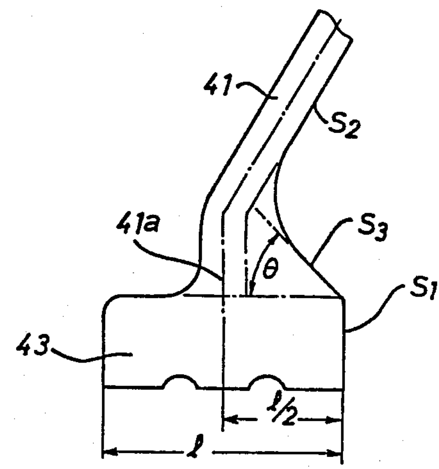
FIG. 2 illustrates, in an enlarged scale, a configuration of a cylindrical sealing sleeve portion of the boot shown in FIG. 1.
Figure 3:
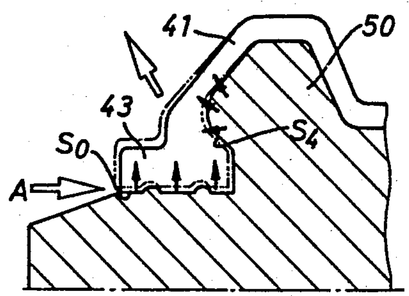
FIG. 3 illustrates a removal process of the sealing sleeve portion from a moulding die.
Figure 4:
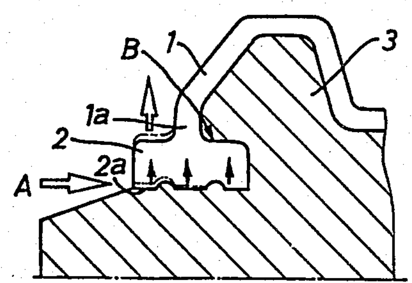
FIG. 4 illustrates a removal process of a conventional sealing sleeve portion from a conventional moulding die.

As can be well seen in FIG. 2, the outside sealing sleeve portion 43 is integrally connected substantially at its center to the outer end 41*a* of bellows 41 and is formed at its inner end shoulder with an annular thick wall tapering radially from its inner end surface $S_1$ toward the inner wall surface $S_2$ of bellows 41 to provide a tapered surface $S_3$ at an angle $\theta$. In the figure, the axial length of sleeve portion 43 is indicated by the reference character l, and the center of sleeve portion 43 is indicated by the reference character l/2. FIG. 3 illustrates a removal process of the outside sealing sleeve portion 43 from its corresponding moulding die 50. As can be well seen in this figure, when pushed up by the air under pressure entering between the inner peripheral surface $S_0$ of portion 43 and the corresponding surface of die 50 from an arrow direction A, the outside sealing sleeve portion 43 is guided outwardly by a tapered surface $S_4$ of die 50 corresponding to its inner tapered surface $S_3$. Subsequentially, the air under pressure flows to remove the bellows portion 41 and inside sealing sleeve portion 42 (not shown) from die 50. Thus, the moulded outside sealing sleeve portion 43 can be removed by the air under pressure from die 50 to enhance the productivity of the sealing boot 40. In the actual practices of the present invention, it is preferred that the angle $\theta$ of tapered surface $S_3$ is determined to be about 45°. Alternatively, the angle $\theta$ of tapered surface $S_3$ may be determined to be 20°–70°.

Although a specific embodiment of the present invention has been shown and described, it is obvious that many modifications thereof are possible. The invention, therefore, is not intended to be restricted to the exact showing of the drawings and description thereof, but is considered to include reasonable and obvious equivalents.

What is claimed is:

1. In a sealing boot of elastomeric material for hermetically enclosing an annular opening between support and movable members in relatively reciprocable relationship, said sealing boot including a tubular bellows which is integrally formed at the opposite ends thereof with a pair of cylindrical sealing sleeve portions respectively attached to said support and movable members, and one of the cylindrical sealing sleeve portions being connected substantially at its center to one end of said tubular bellows;

the improvement wherein the said one of the cylindrical sealing sleeve portions is formed at its inner end shoulder with an annular thick wall tapering radially toward the inner wall of said tubular bellows.

2. A sealing boot of elastomeric material for hermetically enclosing an annular opening between a support member and a movable member axially reciprocable on said support member, said sealing boot including a tubular bellows which is integrally formed at one end thereof with a first cylindrical sealing sleeve portion coupled over said support member and at the other end thereof with a second cylindrical sealing sleeve portion coupled within said movable member, and the first cylindrical sealing sleeve portion being connected substantially at its center to the one end of said tubular bellows and being formed at its inner end shoulder with an annular thick wall tapering radially toward the inner wall of said tubular bellows.

* * * * *